(12) United States Patent
Nowicki et al.

(10) Patent No.: US 12,188,584 B2
(45) Date of Patent: Jan. 7, 2025

(54) FLUID CONNECTION ASSEMBLY

(71) Applicant: Oetiker NY, Inc., Lancaster, NY (US)

(72) Inventors: Eric Nowicki, Buffalo, NY (US); Kristian James Hagen, Gasport, NY (US); Hayden Allis, Albion, NY (US)

(73) Assignee: Oetiker NY, Inc., Lancaster, NY (US)

( * ) Notice: Subject to any disclaimer, the term of this patent is extended or adjusted under 35 U.S.C. 154(b) by 22 days.

(21) Appl. No.: 18/246,627

(22) PCT Filed: Jun. 2, 2021

(86) PCT No.: PCT/US2021/035393
§ 371 (c)(1),
(2) Date: Mar. 24, 2023

(87) PCT Pub. No.: WO2022/093323
PCT Pub. Date: May 5, 2022

(65) Prior Publication Data
US 2023/0375113 A1    Nov. 23, 2023

Related U.S. Application Data

(63) Continuation-in-part of application No. PCT/US2020/057312, filed on Oct. 26, 2020.

(51) Int. Cl.
*F16L 23/04* (2006.01)
*F16L 21/06* (2006.01)
*F16L 37/12* (2006.01)

(52) U.S. Cl.
CPC .............. *F16L 23/04* (2013.01); *F16L 21/06* (2013.01); *F16L 37/1225* (2013.01)

(58) Field of Classification Search
CPC ........ F16L 23/04; F16L 21/06; F16L 37/1225
See application file for complete search history.

(56) References Cited

U.S. PATENT DOCUMENTS

| 4,640,534 A | 2/1987 | Hoskins et al. |
| 4,753,458 A | 6/1988 | Case et al. |
(Continued)

FOREIGN PATENT DOCUMENTS

| CN | 104884853 | 9/2015 |
| CN | 111594624 | 8/2020 |
(Continued)

OTHER PUBLICATIONS

DE-102011121828-A1—Machine Translation—English (Year: 2013).*

*Primary Examiner* — William S. Choi
(74) *Attorney, Agent, or Firm* — Harter Secrest & Emery LLP; Michael Nicholas Vranjes

(57) ABSTRACT

A fluid connection assembly, including a connector body, including a first end, a second end, a through-bore, and a radially outward facing surface including a groove, the groove including a first width, and a retainer operatively arranged to be removably connected to the connector body, the retainer including a third end, a fourth end, a first section, a second section displaceable with respect to the first section, a radially inward facing surface, a first flange extending radially inward from the radially inward facing surface and operatively arranged to engage the groove, the first flange including a second width, the second width being less than the first width, and a second flange extending radially inward from the radially inward facing surface.

9 Claims, 10 Drawing Sheets

(56) References Cited

U.S. PATENT DOCUMENTS

| | | | |
|---|---|---|---|
| 5,297,818 A | 3/1994 | Klinger | |
| 5,459,500 A | 10/1995 | Klinger et al. | |
| 5,468,028 A | 11/1995 | Olson | |
| 5,472,242 A | 12/1995 | Petersen | |
| 5,584,411 A * | 12/1996 | Channell | F16L 23/04 |
| 5,647,612 A | 7/1997 | Yoshida et al. | |
| 5,681,061 A | 10/1997 | Olson | |
| 5,842,450 A * | 12/1998 | Fort | F16L 37/1225 |
| 5,909,901 A | 6/1999 | Zillig et al. | |
| 5,979,946 A | 11/1999 | Petersen et al. | |
| 6,481,086 B1 | 11/2002 | Davidson | |
| 6,880,859 B2 | 4/2005 | Breay et al. | |
| 6,913,294 B2 | 7/2005 | Treverton et al. | |
| 7,128,347 B2 | 10/2006 | Kerin | |
| 7,240,930 B2 | 7/2007 | Stravitz | |
| 7,300,078 B2 | 11/2007 | Yamamoto et al. | |
| 7,364,207 B2 | 4/2008 | McGee et al. | |
| 7,497,477 B2 | 3/2009 | Pepe | |
| 7,631,905 B2 | 12/2009 | McGee et al. | |
| 7,802,822 B2 | 9/2010 | Poder et al. | |
| 7,828,338 B2 | 11/2010 | Kertesz et al. | |
| 7,963,570 B2 | 6/2011 | Swift et al. | |
| 8,375,550 B2 | 2/2013 | Swift et al. | |
| 10,221,976 B2 | 3/2019 | Kujawski et al. | |
| 10,273,996 B2 | 4/2019 | Whitaker et al. | |
| 10,281,075 B2 | 5/2019 | Hontz et al. | |
| 10,738,926 B2 | 8/2020 | Stieler | |
| 11,092,269 B2 | 8/2021 | Kujawski, Jr. et al. | |
| 2006/0022467 A1 * | 2/2006 | Yamamoto | F16L 23/04 |
| 2008/0111376 A1 | 5/2008 | Ferrero | |
| 2009/0091125 A1 * | 4/2009 | Takeda | |
| 2009/0119886 A1 | 5/2009 | Werth | |
| 2010/0032937 A1 | 2/2010 | Kerin et al. | |
| 2011/0006517 A1 | 1/2011 | Nakata | |
| 2011/0101674 A1 | 5/2011 | Benvenuto et al. | |
| 2012/0104746 A1 | 5/2012 | Fansler et al. | |
| 2014/0210202 A1 * | 7/2014 | Hess | F16L 23/04 |
| 2016/0363247 A1 | 12/2016 | McCure | |
| 2017/0114935 A1 | 4/2017 | Kujawski, Jr et al. | |
| 2017/0254453 A1 | 9/2017 | Fremont et al. | |
| 2018/0328525 A1 | 11/2018 | Kerin, Jr. | |
| 2019/0063656 A1 | 2/2019 | Kujawski, Jr. | |
| 2022/0049731 A1 | 2/2022 | You | |

FOREIGN PATENT DOCUMENTS

| | | | |
|---|---|---|---|
| CN | 212251624 | 12/2020 | |
| DE | 102011121828 A1 * | 6/2013 | F16L 37/1225 |
| EP | 1939514 | 7/2008 | |
| EP | 3361134 | 8/2018 | |
| EP | 3430302 | 4/2020 | |
| JP | H 08-277983 A | 10/1996 | |
| JP | 2008-082463 A | 4/2008 | |
| JP | 2008-520932 A | 6/2008 | |
| JP | 2008-281190 A | 11/2008 | |
| JP | 2009-103303 A | 5/2009 | |
| JP | 4703885 | 6/2011 | |
| JP | 5743765 | 7/2015 | |
| JP | 2016-070434 A | 5/2016 | |
| JP | 2017-096494 A | 6/2017 | |
| JP | 2019-011862 A | 1/2019 | |
| JP | 2020-514635 A | 5/2020 | |
| JP | 2021001626 | 1/2021 | |
| WO | 2006-055668 A2 | 5/2006 | |
| WO | 2018-127750 A1 | 7/2018 | |

\* cited by examiner

FLUID CONNECTION ASSEMBLY

CROSS-REFERENCE TO RELATED APPLICATIONS

The present application is the U.S. National Stage Application pursuant to 35 U.S.C. § 371 of International Patent Application No. PCT/US2021/035393, filed on Jun. 2, 2021, which application claims the benefit under Articles 4 and 8 of the Stockholm Act of the Paris Convention for the Protection of Industrial Property of International Patent Application No. PCT/US2020/057312, filed on Oct. 26, 2020, which applications are hereby incorporated by reference herein in their entireties.

FIELD

The present disclosure relates to fluid connectors, and, more particularly, to a fluid connection assembly including a retainer that decreases the insertion force required for assembly and allows for quick assembly without the need for tools.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, in order for the fluid connector to properly function, slots or apertures must be machined in the connector body such that the retaining clip can protrude therethrough and engage the tube, which requires extra post-process manufacturing. During the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process.

Thus, there has been a long-felt need for a fluid connection assembly including a retainer that allows for disassembly, eliminates the need for post-process machining, and reduces the insertion force required to assemble the fluid connector.

SUMMARY

According to aspects illustrated herein, there is provided a fluid connection assembly, comprising a connector body, including a first end, a second end, a through-bore, and a radially outward facing surface comprising a groove, the groove including a first width, and a retainer operatively arranged to be removably connected to the connector body, the retainer including a third end, a fourth end, a first section, a second section displaceable with respect to the first section, a radially inward facing surface, a first flange extending radially inward from the radially inward facing surface and operatively arranged to engage the groove, the first flange comprising a second width, the second width being less than the first width, and a second flange extending radially inward from the radially inward facing surface.

In some embodiments, in a fully assembled locked state, the radially inward facing surface is operatively arranged to engage the radially outward facing surface. In some embodiments, when the first flange is engaged with the groove the retainer is axially displaceable with respect to the connector body. In some embodiments, the first flange is arranged immediately adjacent the third end and the second flange is arranged immediately adjacent the fourth end. In some embodiments, the fluid connection assembly further comprises a tube including a shoulder, wherein the retainer is arranged to secure the tube to the connector body. In some embodiments, the shoulder is arranged to engage the second end, and the second flange maintains the shoulder in engagement with the second end. In some embodiments, when the retainer is locked to the connector body and the tube is not connected to the connector body, the retainer is axially displaceable with respect to the connector body. In some embodiments, when the tube is connected to the connector body and the retainer is locked to the connector body and the tube, the retainer is not axially displaceable with respect to the connector body. In some embodiments, the second section is pivotably connected to the first section. In some embodiments, the first section comprises a male connector, the second section comprises a female connector, and in a fully assembled locked state, the male connector is engaged with the female connector to fixedly secure the first section to the second section. In some embodiments, the female connector comprises a recess extending radially outward from the radially inward facing surface and an aperture extending through the recess, and the male connector comprises a radially outward extending projection operatively arranged to engage the aperture.

According to aspects illustrated herein, there is provided a fluid connection assembly, comprising a connector body, including a first end, a second end, a through-bore, and a radially outward facing surface comprising a groove, the groove including a first width, a retainer operatively arranged to be removably connected to the connector body, the retainer including a third end, a fourth end, a first section, a second section, a radially inward facing surface, a first flange arranged immediately adjacent the third end, extending radially inward from the radially inward facing surface, and operatively arranged to engage the groove, the first flange including a second width, and a second flange arranged immediately adjacent the fourth end, extending radially inward from the radially inward facing surface, and a tube including a shoulder, wherein in a fully assembled locked state the second flange secures the shoulder to the connector body.

In some embodiments, the second width is less than the first width. In some embodiments, in the fully assembled locked state, the first flange is engaged with the first groove, the shoulder abuts against the second end, and the second flange abuts against the shoulder. In some embodiments, when the first flange is engaged with the groove the retainer is axially displaceable with respect to the connector body. In some embodiments, the connector body further comprises a recess extending from the second end in a first axial direction, the recess comprising a first diameter. In some embodiments, the second flange comprises a second diameter, the second diameter being less than the first diameter. In some embodiments, the shoulder comprises a third diameter, in the fully assembled locked state the shoulder is arranged in the recess, and the third diameter is greater than the second diameter and less than the first diameter. In some embodiments, the second section is pivotably connected to the first section, the first section comprises a male connector, the second section comprises a female connector, and in the fully assembled locked state, the male connector is engaged with the female connector to fixedly secure the first section to the second section. In some embodiments, the female connector comprises a recess extending radially outward from the radially inward facing surface and an aperture extending through the recess, and the male connector comprises a radially outward extending projection operatively arranged to engage the aperture.

According to aspects illustrated herein, there is provided a fluid connection assembly, comprising a connector body, including a first end, a second end, a through-bore, and a radially outward facing surface comprising a groove, and a retainer operatively arranged to be removably connected to the connector body, the retainer including a third end, a fourth end, a first section, a second section, a radially inward facing surface, a first flange extending radially inward from the radially inward facing surface and operatively arranged to engage the groove, and a second flange extending radially inward from the radially inward facing surface and operatively arranged to engage the second end.

In some embodiments, in a fully assembled locked state, the radially inward facing surface is operatively arranged to abut against the radially outward facing surface. In some embodiments, in a fully assembled locked state, the first flange is engaged with the groove and the second flange abuts against the second end. In some embodiments, the first flange is arranged immediately adjacent the third end and the second flange is arranged immediately adjacent the second end. In some embodiments, the connector body further comprises a recess extending from the second end in a first axial direction, the recess comprising a first diameter. In some embodiments, the second flange comprises a second diameter, the second diameter being less than the first diameter. In some embodiments, the fluid connection assembly further comprises a tube including a shoulder, wherein the retainer is arranged to secure the tube to the connector body. In some embodiments, the shoulder is arranged in the recess and the second flange retains the shoulder in the recess. In some embodiments, the second section is pivotably connected to the first section. In some embodiments, the first section comprises a male connector, the second section comprises a female connector, and in a fully assembled locked state, the male connector is engaged with the female connector to fixedly secure the first section to the second section. In some embodiments, the female connector comprises a recess extending radially outward from the radially inward facing surface and an aperture extending through the recess, and the male connector comprises a radially outward extending projection operatively arranged to engage the aperture.

According to aspects illustrated herein, there is provided a fluid connection assembly, comprising a connector body, including a first end, a second end, a through-bore, and a radially outward facing surface comprising a groove, a retainer operatively arranged to be removably connected to the connector body, the retainer including a third end, a fourth end, a first section, a second section, a radially inward facing surface, a first flange arranged immediately adjacent the third end, extending radially inward from the radially inward facing surface, and operatively arranged to engage the groove, and a second flange arranged immediately adjacent the fourth end, extending radially inward from the radially inward facing surface, and operatively arranged to engage the second end, and a tube including a shoulder, wherein in a fully assembled locked state the second flange secures the shoulder in the connector body.

In some embodiments, in the fully assembled locked state, the radially inward facing surface is abuts against the radially outward facing surface. In some embodiments, in the fully assembled locked state, the first flange is engaged with the first groove and the second flange abuts against the second end. In some embodiments, the connector body further comprises a recess extending from the second end in a first axial direction, the recess comprising a first diameter. In some embodiments, the second flange comprises a second diameter, the second diameter being less than the first diameter. In some embodiments, the shoulder comprises a third diameter, in the fully assembled locked state the shoulder is arranged in the recess, and the third diameter is greater than the second diameter and less than the first diameter. In some embodiments, the second section is pivotably connected to the first section. In some embodiments, the first section comprises a male connector, the second section comprises a female connector, and in the fully assembled locked state, the male connector is engaged with the female connector to fixedly secure the first section to the second section. In some embodiments, the female connector comprises a recess extending radially outward from the radially inward facing surface and an aperture extending through the recess, and the male connector comprises a radially outward extending projection operatively arranged to engage the aperture.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
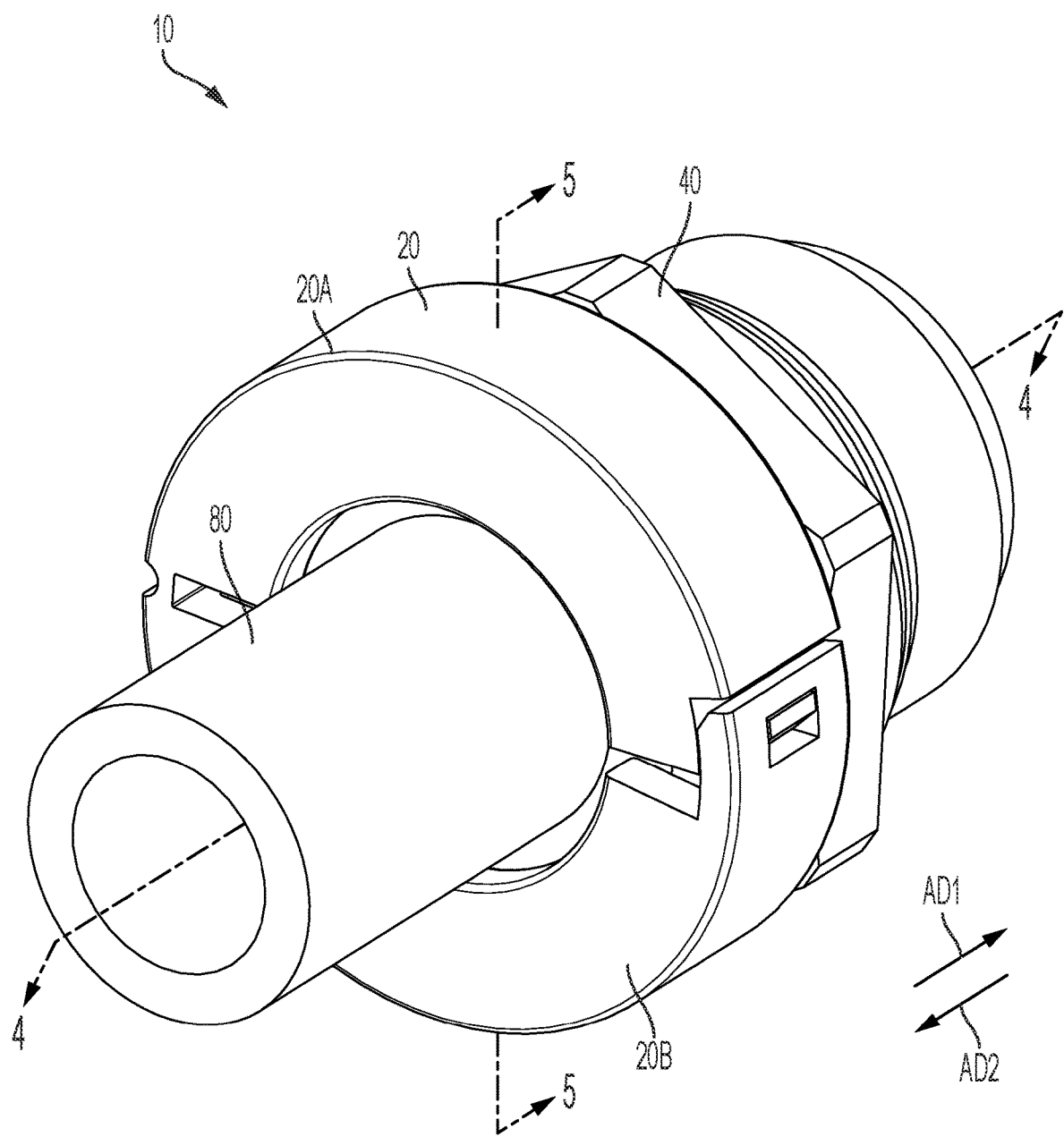
FIG. 1 is a perspective view of a fluid connection assembly, in a fully assembled locked state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

"Fully assembled locked state" as used herein refers to the fluid connection assembly and indicates that the tube is fully connected to the connector body and the retainer is fully connected to the connector body to retain the tube therein. "Partially assembled locked state" as used herein refers to the fluid connection assembly and indicates that the retainer is fully connected to the connector body but the tube is not arranged in the connector body or the retainer. The retainer may also be described as having a "locked state" or an "unlocked state," which indicates the state of the retainer independent of the connector body and the tube.

Figure 2:
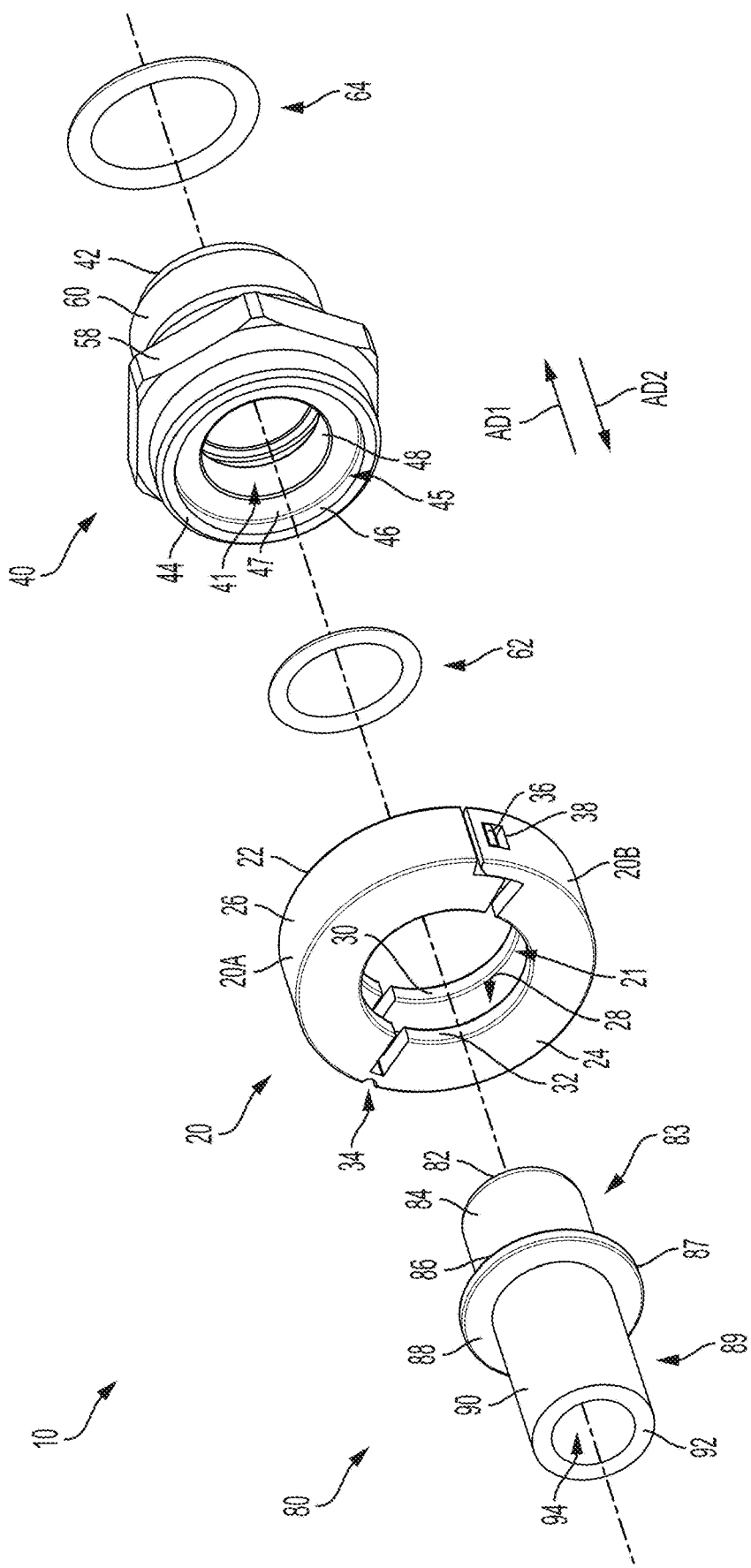
FIG. 2 is an exploded perspective view of the fluid connection assembly shown in FIG. 1.

Adverting now to the figures, FIG. 1 is a perspective view of fluid connection assembly 10, in a fully assembled locked state. FIG. 2 is an exploded perspective view of fluid connection assembly 10. Fluid connection assembly 10 generally comprises retainer 20, tube 80, and connector body 40. The following description should be read in view of FIGS. 1-2.

Tube 80 comprises end 82, section 83, bead or shoulder 87, section 89, end 92, and through-bore 94. Through-bore 94 extends through tube 80 from end 82 to end 92. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 4). Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increase in diameter in axial direction AD2. In some embodiments, surface 86 may comprise a linear portion and a conical or frusto-conical portion. Section 89 is arranged between shoulder 87 and end 92 and comprises radially outward facing surface 90. Radially outward facing surface 90 includes a substantially constant diameter. Tube 80 is arranged to be inserted, specifically with end 82 first, into connector body 40. Tube 80 is inserted into connector body 40 until section 83, or radially outward facing surface 84, engages seal 62 (see FIG. 4). Shoulder 87 is arranged in recess 45 and thus inside of connector body 40, at which point retainer 20 is assembled to secure tube 80 to connector body 40, as will be described in greater detail below. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal. In some embodiments, tube 80 comprises a polymer. In some embodiments, tube 80 comprises a ceramic.

Figure 3:
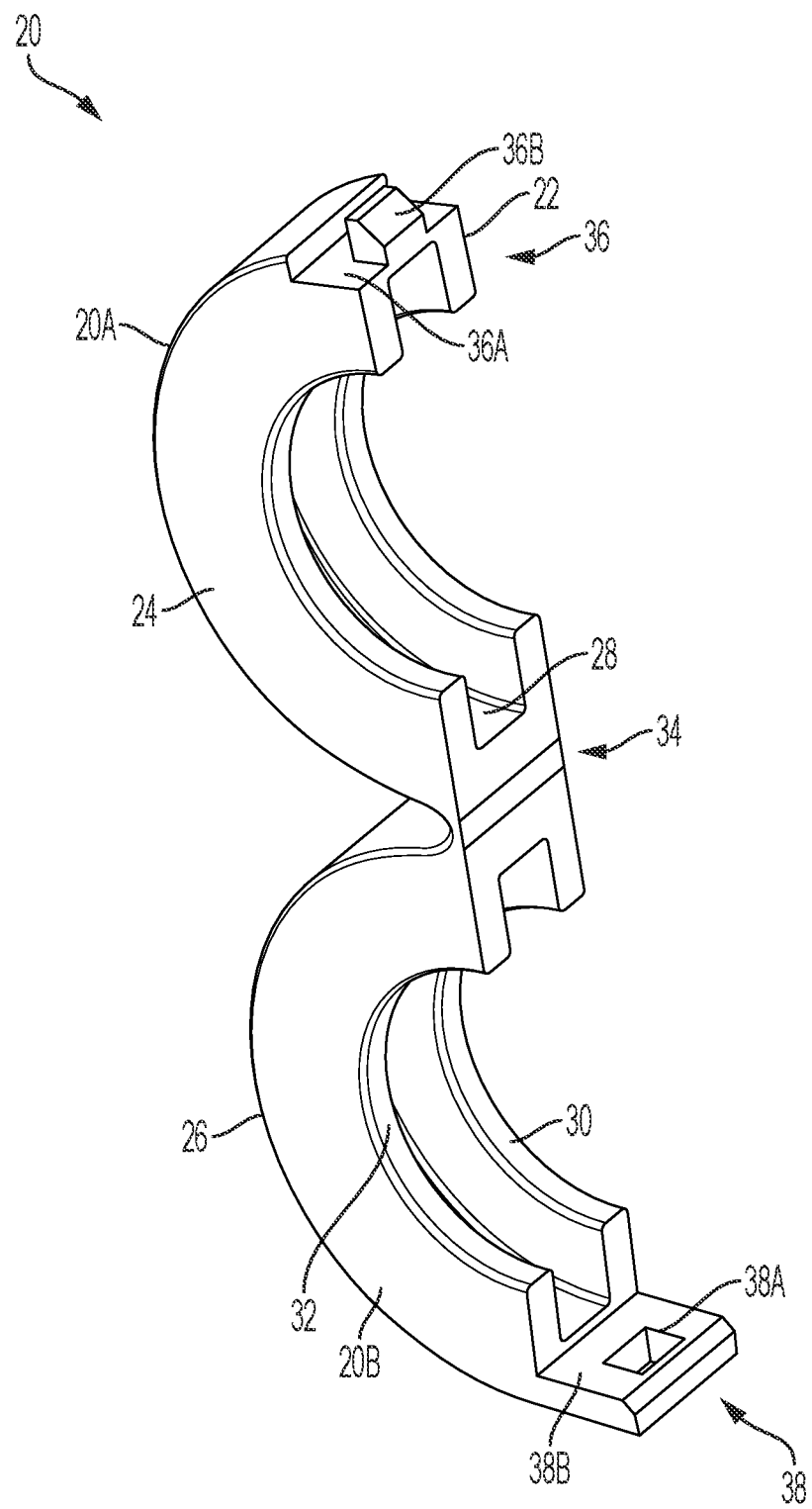
FIG. 3 is a perspective view of the retainer shown in FIG. 1, in an unlocked state.
Figure 4:
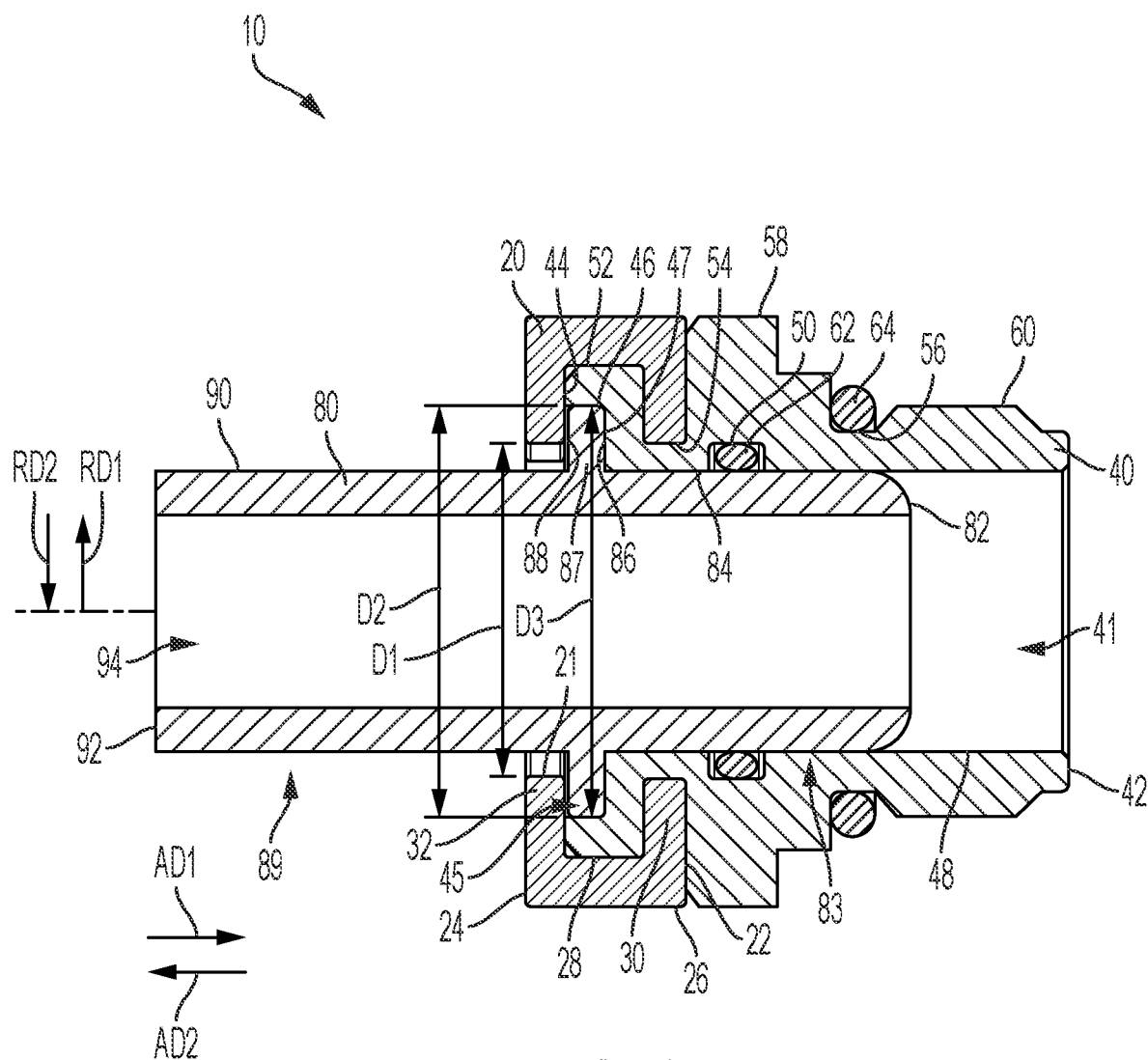
FIG. 4 is a cross-sectional view of the fluid connection assembly taken generally along line 4-4 in FIG. 1.
Figure 5:
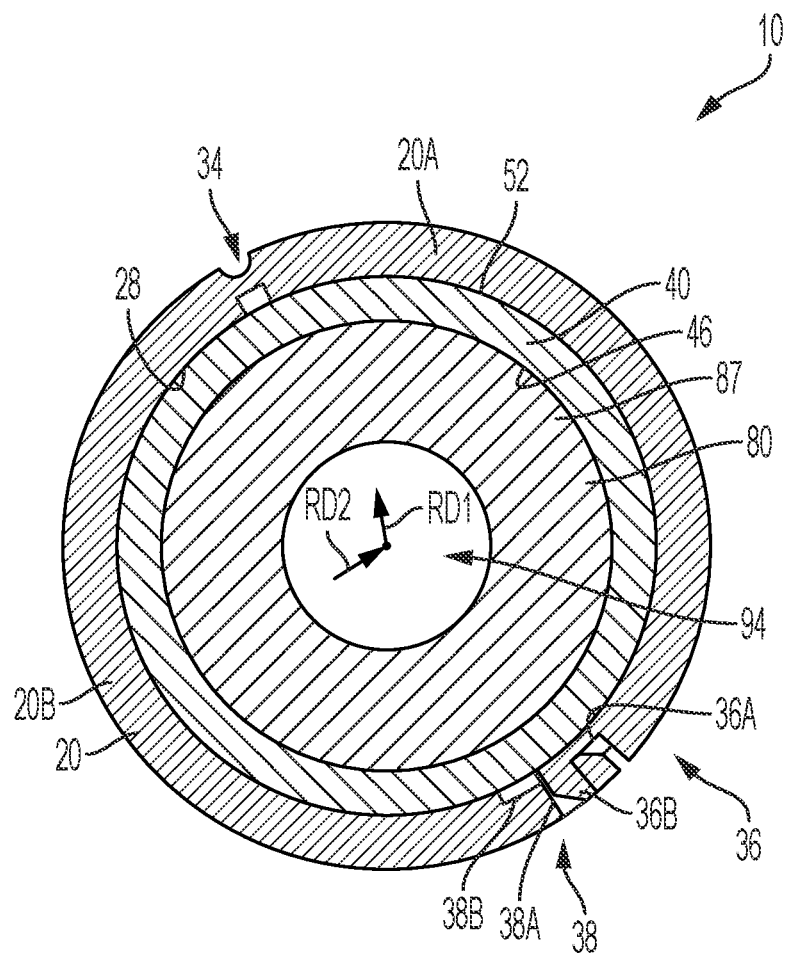
FIG. 5 is a cross-sectional view of the fluid connection assembly taken generally along line 5-5 in FIG. 1.

FIG. 3 is a perspective view of retainer 20, in an unlocked state. FIG. 4 is a cross-sectional view of fluid connection assembly 10 taken generally along line 4-4 in FIG. 1. FIG. 5 is a cross-sectional view of fluid connection assembly 10 taken generally along line 5-5 in FIG. 1. The following description should be read in view of FIGS. 1-5.

Retainer 20 generally comprises section 20A, section 20B, end 22, end 24, hole 21 extending from end 22 to end 24, radially outward facing surface 26, and radially inward facing surface 28. In some embodiments, section 20A is hingedly connected to section 20B, via, for example, hinge 34. In some embodiments, hinge 34 is a living hinge. In some embodiments, section 20A is removably connected to section 20B. When sections 20A and 20B are connected or retainer 20 is in the locked state (FIGS. 1-2), hole 21 is formed therebetween; however, it should be appreciated that even in the unlocked state, it could be said that each of sections 20A and 20B include a respective hole 21.

Radially inward facing surface 28 extends from end 22 and is operatively arranged to engage radially outward facing surface 52. Radially inward facing surface 28 comprises flange 30 extending radially inward therefrom. Flange 30 is arranged immediately adjacent end 22. Flange 30 is operatively arranged to engage groove 54 and radially inward facing surface 28 is operatively arranged to engage radially outward facing surface 52 to connect retainer 20 to connector body 40. Radially inward facing surface 28 further comprises flange 32 extending radially inward therefrom. Flange 32 is arranged immediately adjacent end 24. Flange 32 is operatively arranged to engage shoulder 87 to connect tube 80 to connector body 40.

As best seen in FIG. 4, flange 32 is spaced apart from flange 30 by a first distance. Groove 54 is spaced apart from end 44 by a second distance. The second distance is equal to the first distance. This design results in, when retainer 20 is connected to connector body 40, flange 32 abutting against end 44. Additionally, flange 32 comprises diameter D1, radially inward facing surface 46 comprises diameter D2, and shoulder 87 comprises diameter D3. Diameter D3 is less than diameter D2, which allows shoulder 87 to fit within axial recess 45 of connector body 40 formed by radially inward facing surface 46 and axial surface 47. Diameter D1 is less than diameter D3, which thus prevents shoulder 87 from being removed from connector body 40, or tube 80 from displacing in axial direction AD2 relative to connector body 40.

Section 20A comprises male connector 36 and section 20B comprises female connector 38. As shown, male connector 36 on section 20A is arranged to engage female connector 38 on section 20B such that sections 20A and 20B are fixedly secured. In some embodiments, male connector 36 is hook-shaped (in a radially outward direction) and includes groove 36A and projection 36B. Groove 36A is arranged in radially outward facing surface 26. Projection 36B extends generally radially outward in radial direction RD1 from groove 36A. In some embodiments, projection 36B comprises a tapered section near its radially outermost end operatively arranged to allow engagement of projection 36B with female connector 38, specifically, aperture 38A, to occur with greater ease.

Female connector 38 comprises aperture 38A extending radially inward from radially outward facing surface 26. Aperture 38A is operatively arranged to engage projection 36B to lock section 20B to section 20A. Female connector 38 further comprises recess 38B. In some embodiments, recess 38B is arranged in radially inward facing surface 26 (i.e., extends radially outward from radially inward facing surface 26). As section 20B is displaced toward section 20A, female connector 38 engages projection 36B and displaces radially outward in radial direction RD1. Once aperture 38A is aligned with projection 36B, female connector 38 snaps back radially inward, in radial direction RD2, thereby securing section 20B to section 20A.

In some embodiments, retainer 20 comprises a metal. In some embodiments, retainer 20 comprises a polymer. In some embodiments, retainer 20 comprises a ceramic.

Connector body 40 comprises through-bore 41 extending from end 42 to end 44, radially inward facing surface 46, radially inward facing surface 48, groove 50, radially outward facing surface 52, groove 54, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed in is a condenser, evaporator, or pump. It should be appreciated that fluid connector 10 may be used in various other components, assemblies, and subassemblies in which fluid connection is desired. Radially outward facing surface 60 may further comprise groove 56. Seal or O-ring 64 is arranged in groove 56 to create a fluid tight seal between connector body 40 and the component it is connected to. Seal 62 is arranged in connector body 40. Specifically, seal 62 is arranged in groove 50 to engage tube 80 (i.e., radially outward facing surface 84). Groove 50 is arranged in radially inward facing surface 48. In some embodiments, seal 62 is an O-ring. In some embodiments, and as shown, radially inward facing surface 46 is a substantially cylindrical surface. In some embodiments, radially inward facing surface 46 comprises a frusto-conical surface or radially outward extending taper proximate end 44. In some embodiments, radially inward facing surface 48 is a substantially cylindrical surface. Surface 47 connects surface 46 and surface 48. In some embodiments, surface 47 is an axially facing surface. In some embodiments, surface 47 is a frusto-conical surface. Surface 47 is operatively arranged to engage shoulder 87, specifically, to prevent axial displacement of tube 80 is axial direction AD1. Radially inward facing surface 46 and surface 47 are said to form recess 45 in connector body 40 in which shoulder 87 resides, as will be described in greater detail below. Groove 54 is arranged in radially outward facing surface 52. Groove 54 is arranged axially between end 44 and head 58. In some embodiments, groove 54 is arranged axially between and spaced apart from end 44 and head 58. In some embodiments, groove 54 is arranged immediately adjacent head 58. Groove 54 is operatively arranged to engage with flange 30 to connect retainer 20 to connector body 40. In some embodiments, connector body 40 comprises a metal. In some embodiments, connector body 40 comprises a polymer. In some embodiments, connector body 40 comprises a ceramic.

To assemble fluid connection assembly 10, tube 80 is inserted in axial direction AD1, with end 82 first, into connector body 40. Radially outward facing surface 84 engages seal 62 and section 83 is arranged inside of connector body 40 proximate radially inward facing surface 48. Shoulder 87 engages axial recess 45 of connector body 40, specifically, shoulder 87 engages radially inward facing surface 46 and surface 47. In some embodiments, shoulder 87 resides completely within radially inward facing surface 46 (i.e., shoulder 87 is completely between end 44 and surface 47). In some embodiments, shoulder 87 only partially resides within radially inward facing surface 46 (i.e., shoulder 87 extends past end 44 in axial direction AD2). Then, retainer 20 is secured over both connector body 40 and tube 80. Specifically, sections 20A and 20B are arranged over connector body 40 such that flange 30 is aligned with groove 54. Sections 20A and 20B are displaced radially inward toward each other (i.e., in radial direction RD2) until female connector 38 fully engages male connector 36 and retainer 20 is in the locked state. In the fully assembled locked state, flange 30 engages groove 54, radially inward facing surface 28 engages radially outward facing surface 52, and flange 32 engages shoulder 87 of tube 80. In some embodiments, flange 32 also engages end 44 of connector body 40. In some embodiments, flange 32 engages radially outward facing surface 90. In some embodiments, end 22 engages head 58. The engagement of tube 80 with connector body 40 prevents axial displacement of tube 80 in axial direction AD1 and the engagement of retainer 20 with connector body 40 and tube 80 prevents axial displacement of tube 80 in axial direction AD2, as well as radial directions RD1 and RD2, relative to connector body 40. To disassemble, female connector 38 is displaced radially outward in radial direction RD1 with respect to male connector 36 until aperture 38A disengages projection 36B. Sections 20A and 20B are then separated to disengage flange 32 from shoulder 87, at which point tube 80 can be removed from connector body 40.

Figure 6:
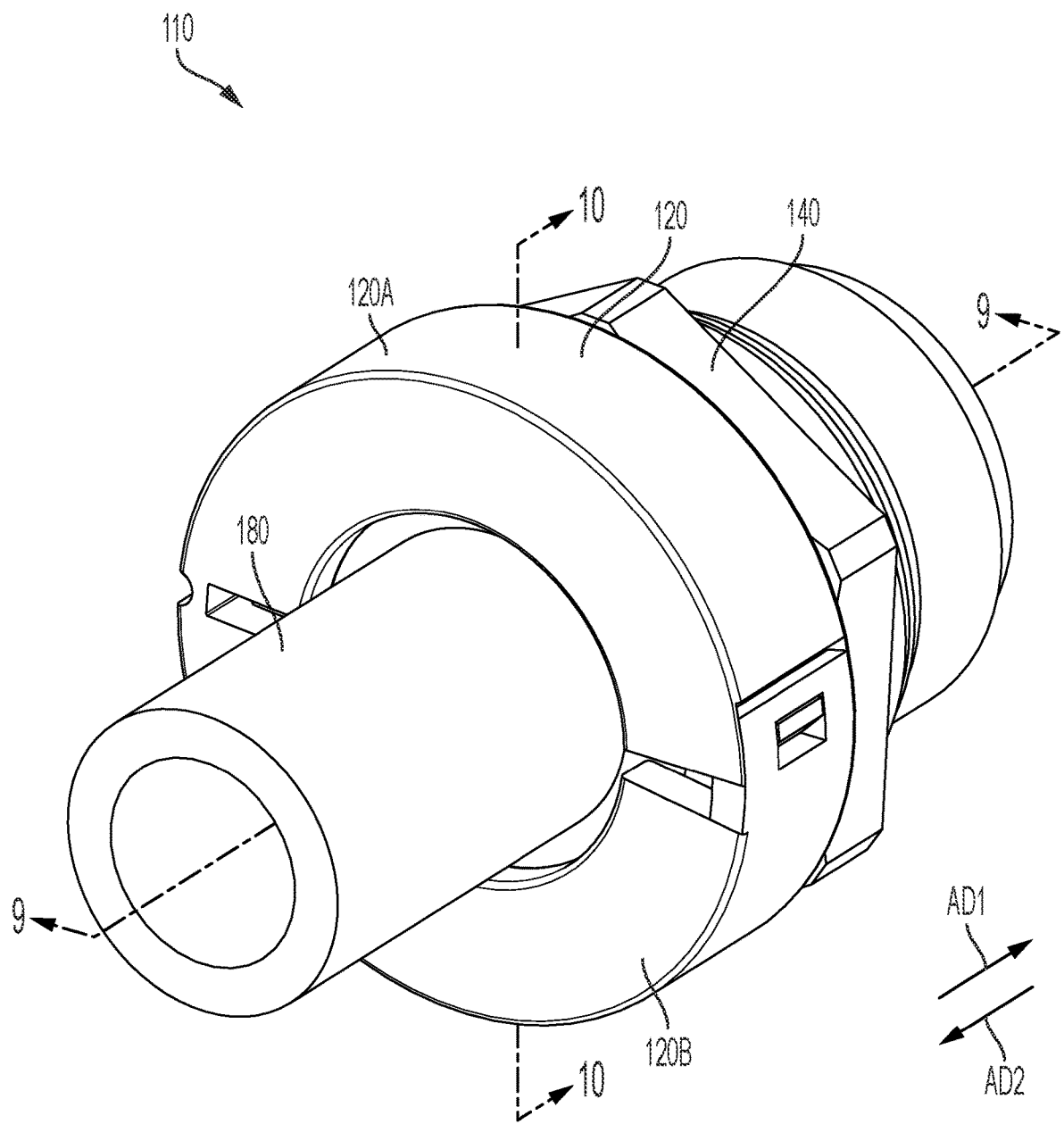
FIG. 6 is a perspective view of a fluid connection assembly, in a fully assembled locked state.
Figure 7:
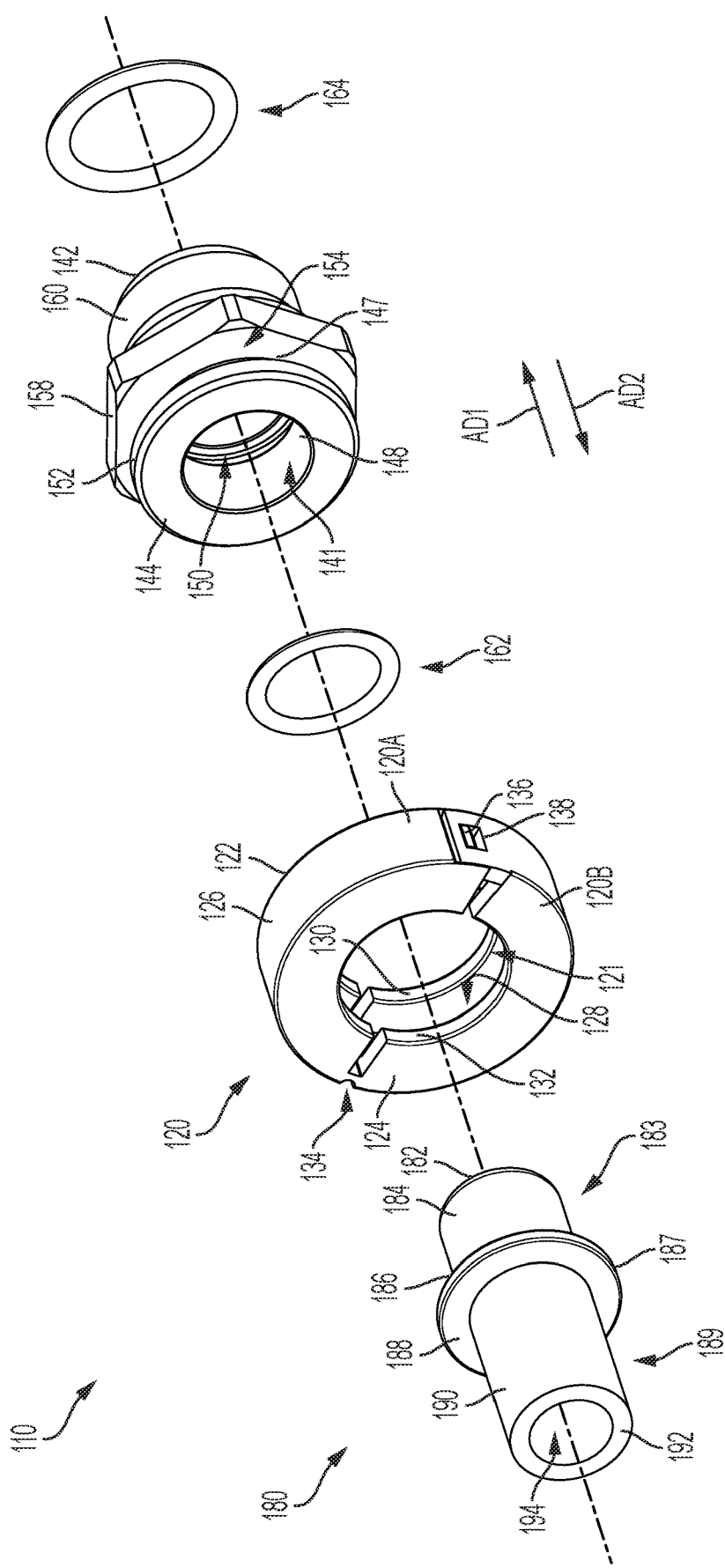
FIG. 7 is an exploded perspective view of the fluid connection assembly shown in FIG. 6.

FIG. 6 is a perspective view of fluid connection assembly 110, in a fully assembled locked state. FIG. 7 is an exploded perspective view of fluid connection assembly 110. Fluid connection assembly 110 generally comprises retainer 120, tube 180, and connector body 140. The following description should be read in view of FIGS. 6-7.

Tube 180 comprises end 182, section 183, bead or shoulder 187, section 189, end 182, and through-bore 194. Through-bore 194 extends through tube 180 from end 182 to end 192. Section 183 is arranged between end 182 and shoulder 187 and comprises radially outward facing surface 184. Radially outward facing surface 184 includes a substantially constant diameter. In some embodiments, radially outward facing surface 184 comprises a frusto-conical taper or curvilinear surface proximate end 182 (see FIG. 9). Shoulder 187 is arranged between section 183 and section 189 and comprises surface 186 and surface 188. In some embodiments, surface 186 is an axial surface facing at least partially in axial direction AD1 and surface 188 is an axial surface facing at least partially in axial direction AD2. In some embodiments, surface 186 is a frusto-conical surface extending from the radially outward facing surface of shoulder 187 radially inward in axial direction AD1. For example, surface 186 may be a linear conical shape and increase in diameter in axial direction AD2. In some embodiments, surface 186 may comprise a linear portion and a conical or frusto-conical portion. Section 189 is arranged between shoulder 187 and end 192 and comprises radially outward facing surface 190. Radially outward facing surface 190 includes a substantially constant diameter. Tube 180 is arranged to be inserted, specifically with end 182 first, into connector body 140. Tube 180 is inserted into connector body 140 until section 183, or radially outward facing surface 184, engages seal 162 (see FIG. 9). Shoulder 187 engages end 144, more specifically, surface 186 abuts against and/or engages end 144, at which point retainer 120 is assembled to secure tube 180 to connector body 140, as will be described in greater detail below. It should be appreciated that tube 180 may be any traditional tube or tube end form comprising a bead, radially outward extending protrusion or flange, or ramp profile, which extends radially outward and axially on the outer surface of the tube, to secure the tube within the connector body. In some embodiments, tube 180 comprises a metal. In some embodiments, tube 180 comprises a polymer. In some embodiments, tube 180 comprises a ceramic.

Figure 8:
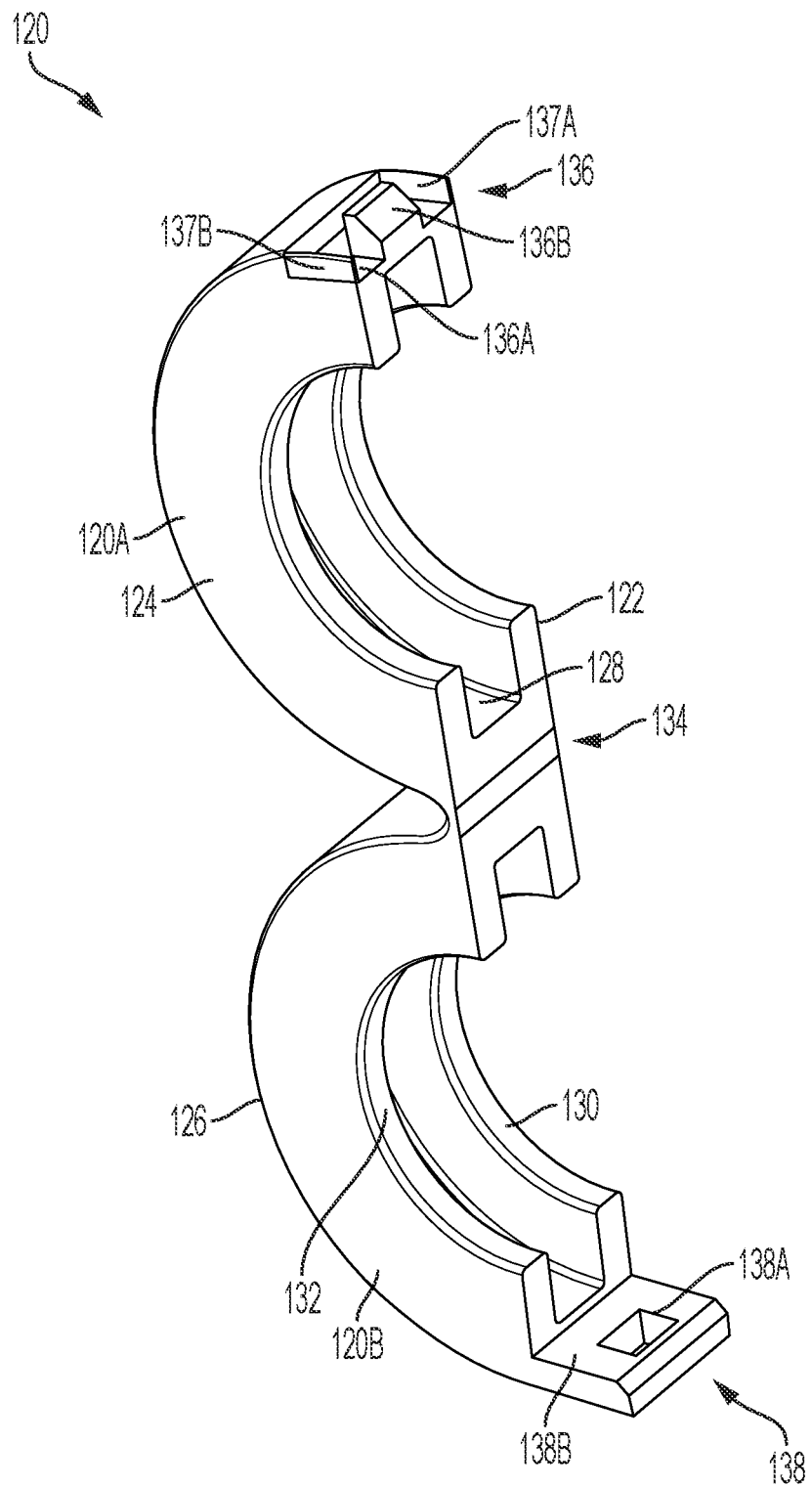
FIG. 8 is a perspective view of the retainer shown in FIG. 6, in an unlocked state.
Figure 9:
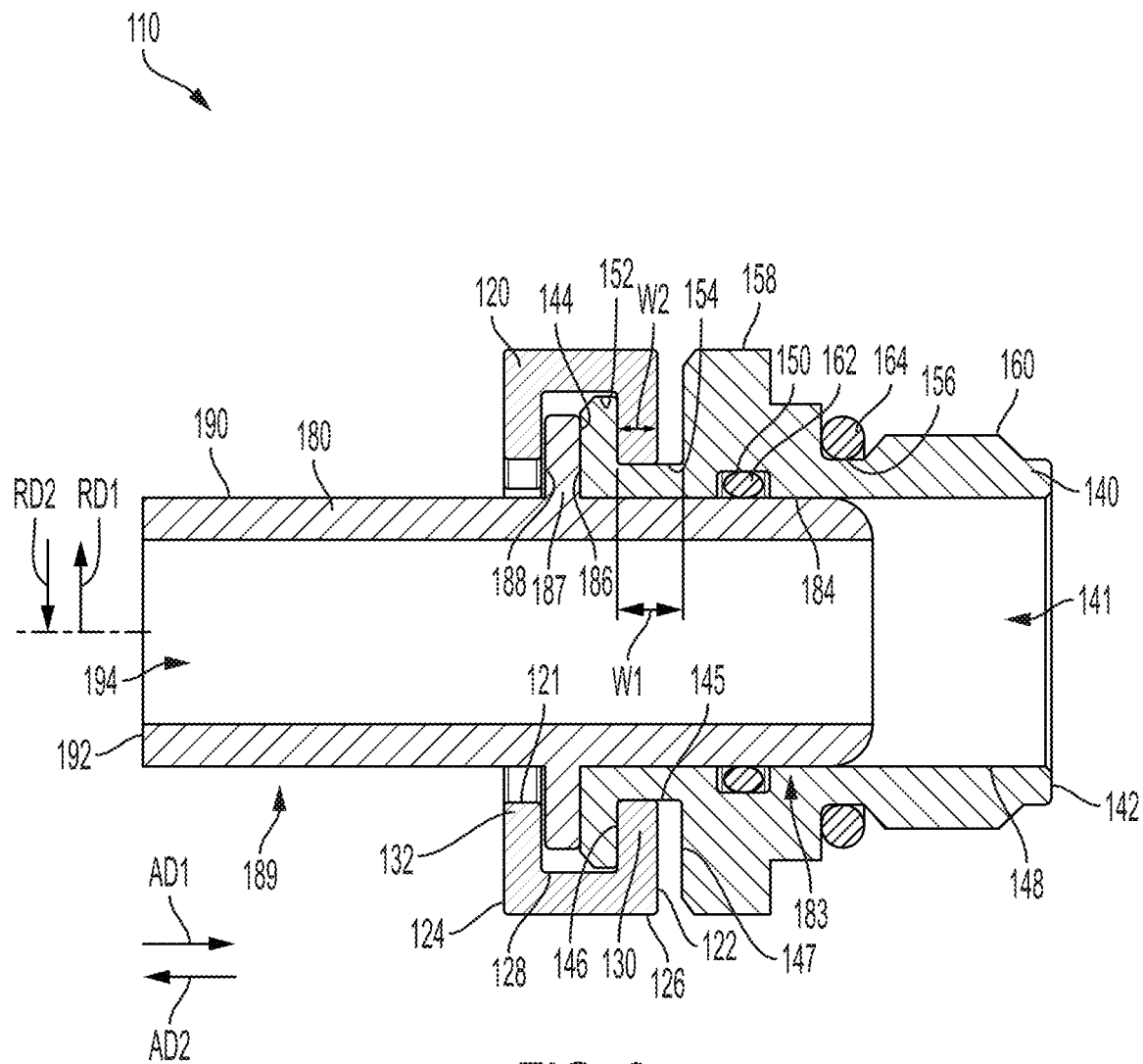
FIG. 9 is a cross-sectional view of the fluid connection assembly taken generally along line 9-9 in FIG. 6; and, FIG. 10 is a cross-sectional view of the fluid connection assembly taken generally along line 10-10 in FIG. 6.
Figure 10:
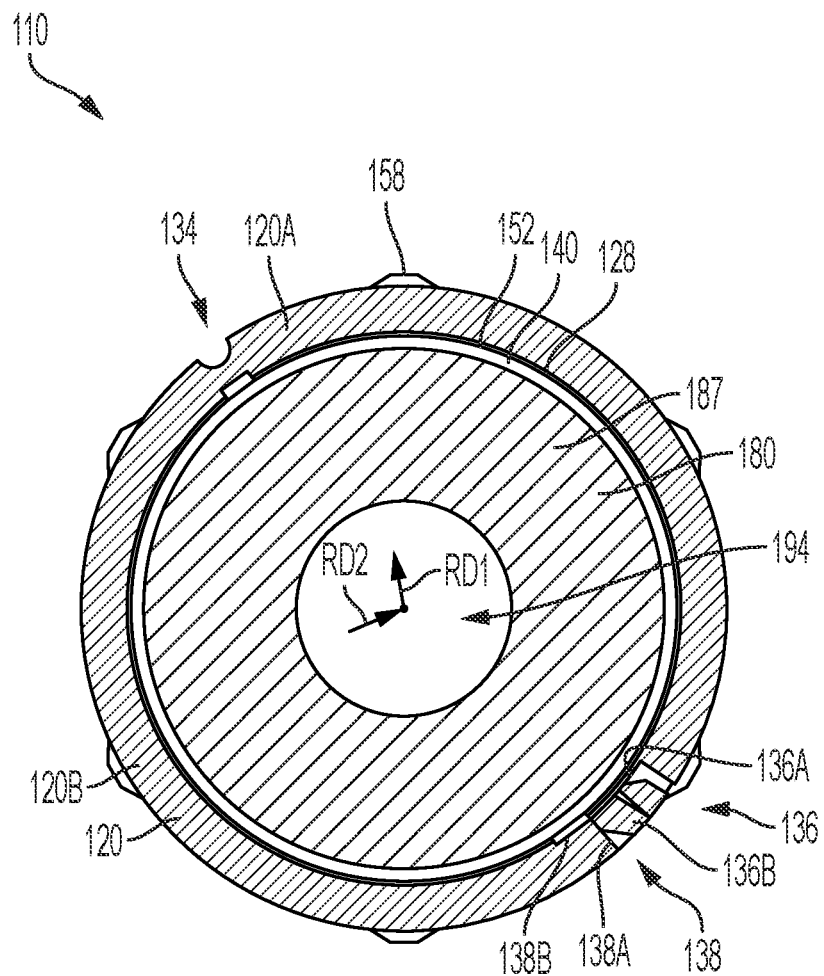

FIG. 8 is a perspective view of retainer 120, in an unlocked state. FIG. 9 is a cross-sectional view of fluid connection assembly 110 taken generally along line 9-9 in FIG. 6. FIG. 10 is a cross-sectional view of fluid connection assembly 110 taken generally along line 10-10 in FIG. 6. The following description should be read in view of FIGS. 6-10.

Retainer 120 generally comprises section 120A, section 120B, end 122, end 124, hole 121 extending from end 122 to end 124, radially outward facing surface 126, and radially inward facing surface 128. In some embodiments, section 120A is hingedly connected to section 120B, via, for example, hinge 134. In some embodiments, hinge 134 is a living hinge. In some embodiments, section 120A is removably connected to section 120B. When sections 120A and 120B are connected or retainer 120 is in the locked state (FIGS. 6-7), hole 121 is formed therebetween; however, it should be appreciated that even in the unlocked state, it could be said that each of sections 120A and 120B include a respective hole 121.

Radially inward facing surface 128 extends from end 122 and is operatively arranged to engage radially outward facing surface 152. Radially inward facing surface 128 comprises flange 130 extending radially inward therefrom. Flange 130 is arranged immediately adjacent end 122. Flange 130 is operatively arranged to engage groove 154 and radially inward facing surface 128 is operatively arranged to engage radially outward facing surface 152 to connect retainer 120 to connector body 140. Radially inward facing surface 128 further comprises flange 132 extending radially inward therefrom. Flange 132 is arranged immediately adjacent end 124. Flange 132 is operatively arranged to engage shoulder 187 to connect tube 180 to connector body 140.

As best seen in FIG. 9, flange 132 is spaced apart from flange 130 by a first distance. Groove 154 is spaced apart from end 44 by a second distance. Shoulder 187 comprises a width equal to a third distance. The first distance is substantially equal to the sum of the second distance and the third distance. This design results in, when retainer 120 is connected to connector body 140 and tube 180, flange 132 abutting against surface 188, as well as surface 186 abutting against surface 186 (i.e., retainer 120 clamps shoulder 187 to end 144). In some embodiments, the first distance is less than the sum of the second distance and the third distance. This results in shoulder 187 and connector body 140 being squeezed or clamped together. In some embodiments, the first distance is greater than the sum of the second distance and the third distance such that shoulder 187 being engaged or in close proximity with connector body 140. Additionally, flange 130 comprises width W2 and groove 154 comprises width W1, width W2 being less than width W1. As such, when retainer 120 is connected to connector body 140 without tube 180, retainer 120 is capable of sliding or displacing in axial direction AD1 and axial direction AD2 with respect to connector body 140. When tube 180 is properly secured to connector body 140 by retainer 120, retainer is not capable of displacing in axial direction AD1 and axial direction AD2 with respect to connector body 140. This feature provides an indicator as to the connection status of fluid connection assembly 110 and will be described in greater detail below.

Flange 132 comprises a first diameter and shoulder 187 comprises a second diameter. The first diameter is less than the second diameter, which thus prevents shoulder 187 from being removed from connector body 140, or tube 180 from displacing in axial direction AD2 or rotating relative to connector body 140. In some embodiments, radially inward facing surface 182 comprises a third diameter equal to the second diameter, which prevents shoulder 187 from displacing in radial direction RD1 or radial direction RD2 with respect to connector body 140.

Section 120A comprises male connector 136 and section 120B comprises female connector 138. As shown, male connector 136 on section 120A is arranged to engage female connector 138 on section 120B such that sections 120A and 120B are fixedly secured. In some embodiments, male connector 136 is hook-shaped (in a radially outward direction) and includes groove 136A and projection 136B. Groove 136A is arranged in radially outward facing surface 126. Projection 136B extends generally radially outward in radial direction RD1 from groove 136A. In some embodiments, projection 136B comprises a tapered section near its radially outermost end operatively arranged to allow engagement of projection 136B with female connector 138, specifically, aperture 138A, to occur with greater ease. In some embodiments, male connector 136 further comprises at least one guide wall, for example guide walls 137A-B. Guide wall 137A is aligned with end 122 and extends radially outward from groove 136A. Guide wall 137B is aligned with end 124 and extends radially outward from groove 136A. Guide walls 137A-B are operatively arranged to engage end 122 and end 124 of female connector 138, respectively, to aid in aligning female connector 138 to male connector 136 during assembly.

Female connector 138 comprises aperture 138A extending radially inward from radially outward facing surface 126. Aperture 138A is operatively arranged to engage projection 136B to lock section 120B to section 120A. Female connector 138 further comprises recess 138B. In some embodiments, recess 138B is arranged in radially inward facing surface 128 (i.e., extends radially outward from radially inward facing surface 128). As section 120B is displaced toward section 120A, female connector 138 engages projection 136B and displaces radially outward in radial direction RD1. Once aperture 138A is aligned with projection 136B, female connector 138 snaps back radially inward, in radial direction RD2, thereby securing section 120B to section 120A.

In some embodiments, retainer 120 comprises a metal. In some embodiments, retainer 120 comprises a polymer. In some embodiments, retainer 120 comprises a ceramic.

Connector body 140 comprises through-bore 141 extending from end 142 to end 144, radially inward facing surface 148, groove 150, radially outward facing surface 152, groove 154, head 158, and radially outward facing surface 160. Connector body 140 is arranged to be connected to a component that is filled with a fluid or through which fluid flows. For example, connector body 140 may be connected to a refrigeration compressor or a transmission via radially outward facing surface 160, which may comprise external threading. Connector body 140 may be screwed into a threaded hole in the compressor via head 158 (e.g., using a wrench), which is then filled with refrigerant fluid. In some embodiments, head 158 is hexagonal; however, it should be appreciated that head 158 may comprise any geometry suitable for applying torque to connector body 140. Another component in which fluid connector 110, specifically connector body 140, may be installed is in a condenser, evaporator, or pump. It should be appreciated that fluid connector 110 may be used in various other components, assemblies, and subassemblies in which fluid connection is desired. Radially outward facing surface 160 may further comprise groove 156. Seal or O-ring 164 is arranged in groove 156 to create a fluid tight seal between connector body 140 and the component it is connected to. Seal 162 is arranged in connector body 140. Specifically, seal 162 is arranged in groove 150 to engage tube 180 (i.e., radially outward facing surface 184). Groove 150 is arranged in radially inward facing surface 148. In some embodiments, seal 162 is an O-ring. In some embodiments, radially inward facing surface 148 is a substantially cylindrical surface. End 144 is operatively arranged to engage shoulder 187, specifically, to prevent axial displacement of tube 180 is axial direction AD1.

Groove 154 is arranged in radially outward facing surface 152. Groove 154 is arranged axially between end 144 and head 158. Groove 154 comprises radially outward facing surface 145, surface 146, and surface 147. Radially outward facing surface 145 comprises a diameter that is less than the diameter of radially outward facing surface 152. Surface 146 extends radially outward from radially outward facing surface 145 and faces in axial direction AD1. Surface 147 extends radially outward from radially outward facing surface 145 and faces in axial direction AD2. In some embodiments, surface 146 and/or surface 147 are arranged perpendicular to radially outward facing surface 145. In some embodiments, groove 154 is arranged axially between and spaced apart from end 144 and head 158. In some embodiments, and as shown, groove 154 is arranged immediately adjacent head 158. Groove 154 is operatively arranged to engage with flange 130 to connect retainer 120 to connector body 140.

Groove 154 comprises width W1 that is greater than width W2 of flange 130. In the partially assembled locked state, when retainer 120 is connected to connector body 140, without tube 180 properly connected or present at all, flange 130 and thus retainer 120 is displaceable in axial direction AD1 and axial direction AD2 with respect to groove 154, and thus connector body 140 (i.e., flange 130 can slide back and forth between surface 146 to and surface 147). This provides an indication that fluid connection assembly 110 is not properly assembled. When retainer 120 is connected to connector body 140, with tube 180 properly connected, flange 130 and thus retainer 120 is not displaceable in axial direction AD1 and axial direction AD2 with respect to groove 154, and thus connector body 140 (i.e., flange 130 abuts against surface 146 as shown in FIG. 9).

In some embodiments, connector body 140 comprises a metal. In some embodiments, connector body 140 comprises a polymer. In some embodiments, connector body 140 comprises a ceramic.

To assemble fluid connection assembly 110, tube 180 is inserted in axial direction AD1, with end 182 first, into connector body 140. Radially outward facing surface 184 engages seal 162 and section 183 is arranged inside of connector body 140 proximate radially inward facing surface 148. Shoulder 187 engages end 144 of connector body 140, specifically, surface 186 abuts against end 144. In some embodiments, and as shown, shoulder 187 resides completely outside of connector body 140. Then, retainer 120 is secured over both connector body 140 and tube 180. Specifically, sections 120A and 120B are arranged over connector body 140 such that flange 130 is at least partially aligned with groove 154 and flange 132 is at least partially aligned with surface 188. Sections 120A and 120B are displaced radially inward toward each other (i.e., in radial direction RD2) until female connector 138 fully engages male connector 136 and retainer 120 is in the locked state. In the fully assembled locked state, flange 130 engages groove 154, radially inward facing surface 128 engages radially outward facing surface 152, and flange 132 engages shoulder 187 of tube 180. In some embodiments, in the fully assembled locked state, flange 130 abuts against surface 146, flange 132 abuts against surface 188, and surface 186 abuts against end 144. In some embodiments, in the fully assembled locked state, flange 130 abuts against radially outward facing surface 145, thus preventing radial or circumferential displacement of retainer 120 with respect to connector body 140. In some embodiments, flange 132 engages radially outward facing surface 190. The engagement of tube 180 with connector body 140 prevents axial displacement of tube 180 in axial direction AD1 and the engagement of retainer 120 with connector body 140 and tube 180 prevents axial displacement of tube 180 in axial direction AD2, as well as radial directions RD1 and RD2, relative to connector body 140. To disassemble, female connector 138 is displaced radially outward in radial direction RD1 with respect to male connector 136 until aperture 138A disengages projection 136B. Sections 120A and 120B are then separated to disengage flange 132 from shoulder 187, at which point tube 180 can be removed from connector body 140.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Retainer
20A Section
20B Section
21 Hole
22 End
24 End
26 Radially outward facing surface
28 Radially inward facing surface
30 Flange
32 Flange
34 Hinge
36 Male connector
36A Groove
36B Projection
38 Female connector
38A Aperture
38B Recess
40 Connector body
41 Through-bore
42 End
44 End
45 Recess
46 Radially inward facing surface
47 Surface
48 Radially inward facing surface
50 Groove
52 Radially outward facing surface
54 Groove
56 Groove
58 Head
60 Radially outward facing surface
62 Seal
64 Seal
80 Tube
82 End
83 Section
84 Radially outward facing surface
86 Surface
87 Shoulder or bead
88 Surface
89 Section
90 Radially outward facing surface
92 End
94 Through-bore
110 Fluid connection assembly
120 Retainer
120A Section
120B Section
121 Hole
122 End
124 End
126 Radially outward facing surface
128 Radially inward facing surface
130 Flange
132 Flange
134 Hinge
136 Male connector
136A Groove
136B Projection
137A Guide wall
137B Guide wall
138 Female connector
138A Aperture
138B Recess
140 Connector body
141 Through-bore
142 End
144 End
145 Radially outward facing surface
146 Axial surface
147 Axial surface
148 Radially inward facing surface 150 Groove
152 Radially outward facing surface
154 Groove
156 Groove
158 Head
160 Radially outward facing surface
162 Seal
164 Seal
180 Tube
182 End
183 Section
184 Radially outward facing surface
186 Surface
187 Shoulder or bead
188 Surface
189 Section
190 Radially outward facing surface
192 End
194 Through-bore
AD1 Axial direction
AD2 Axial direction
D1 Diameter
D2 Diameter
D3 Diameter
RD1 Radial direction
RD2 Radial direction
W1 Width
W2 Width

What is claimed is:

1. A fluid connection assembly, comprising:
 a connector body, including:
  a first end;
  a second end defining a first axially-most end;
  a through-bore; and
  a radially outward facing surface comprising a groove, the groove including a first width;
 a retainer operatively arranged to be removably connected to the connector body, the retainer including:
  a second axially-most end;
  a third axially-most end;
  a first section comprising a male connector;
  a second section pivotably connected to the first section, the second section comprising a female connector;
  a radially inward facing surface;
  a first flange arranged immediately adjacent the second axially-most end, extending radially inward from the radially inward facing surface, and operatively arranged to engage the groove, the first flange including a second width; and
  a second flange arranged immediately adjacent the third axially-most end, extending radially inward from the radially inward facing surface; and a tube including a shoulder;
 wherein:
  in a fully assembled locked state the second flange secures the shoulder to the connector body such that the shoulder abuts against the second end of the connector body and the male connector is engaged with the female connector to fixedly secure the first section to the second section;
  when the retainer is locked to the connector body and the tube is not connected to the connector body, the retainer is axially displaceable with respect to the connector body; and
  when the tube is connected to the connector body and the retainer is locked to the connector body and the tube, the retainer is not axially displaceable with respect to the connector body.

2. The fluid connection assembly as recited in claim 1, wherein the second width is less than the first width.

3. The fluid connection assembly as recited in claim 1, wherein in the fully assembled locked state, the first flange is engaged with the groove, the shoulder abuts against the second end, and the second flange abuts against the shoulder.

4. The fluid connection assembly as recited in claim 1, wherein when the first flange is engaged with the groove the retainer is axially displaceable with respect to the connector body.

5. The fluid connection assembly as recited in claim 1, wherein the connector body further comprises a recess extending from the second end in a first axial direction, the recess comprising a first diameter.

6. The fluid connection assembly as recited in claim 5, wherein the second flange comprises a second diameter, the second diameter being less than the first diameter.

7. The fluid connection assembly as recited in claim 6, wherein:
 the shoulder comprises a third diameter;
 in the fully assembled locked state the shoulder is arranged in the recess; and
 the third diameter is greater than the second diameter and less than the first diameter.

8. The fluid connection assembly as recited in claim 1, wherein:
 the female connector comprises a recess extending radially outward from the radially inward facing surface and an aperture extending through the recess; and
 the male connector comprises a radially outward extending projection operatively arranged to engage the aperture.

9. The fluid connection assembly as recited in claim 1, wherein
 the second flange maintains the shoulder in engagement with the second end.

* * * * *